(12) United States Patent
Tippmann

(10) Patent No.: US 6,753,025 B1
(45) Date of Patent: *Jun. 22, 2004

(54) METHOD OF MAKING PIZZA

(76) Inventor: Eugene R. Tippmann, 10801 Pine Mills Rd., Ft. Wayne, IN (US) 46845

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 897 days.

(21) Appl. No.: 09/157,388

(22) Filed: Sep. 21, 1998

Related U.S. Application Data

(63) Continuation-in-part of application No. 08/804,956, filed on Feb. 24, 1997, now abandoned, which is a continuation of application No. 08/512,338, filed on Aug. 8, 1995, now abandoned.

(51) Int. Cl.[7] .............................................. A21D 13/00
(52) U.S. Cl. ...................... 426/94; 426/275; 426/283; 426/296
(58) Field of Search .............................. 426/94, 92, 89, 426/274, 275, 283, 296

(56) References Cited

U.S. PATENT DOCUMENTS

| | | |
|---|---|---|
| 2,547,206 A | 4/1951 | Hanau |
| 2,668,117 A | 2/1954 | Bucci |
| 3,395,024 A | 7/1968 | Earle |
| 3,879,564 A | 4/1975 | Cocozzella |
| 4,271,200 A | 6/1981 | Hempenius et al. |
| 4,283,424 A | 8/1981 | Manoski et al. |
| 4,303,677 A | 12/1981 | De Acetis |
| 4,416,904 A | 11/1983 | Shannon |
| 4,649,053 A | 3/1987 | Lamonica |
| 4,661,361 A | 4/1987 | Mongiello et al. |
| 5,202,138 A | 4/1993 | Stypula |
| 5,256,432 A | 10/1993 | McDonald et al. |

*Primary Examiner*—Lien Tran
(74) *Attorney, Agent, or Firm*—Nixon Peabody LLP; Donald R. Studebaker

(57) ABSTRACT

A method of preparing a pizza is disclosed comprising the steps of forming a pizza shell, applying a predetermined quantity of pizza or tomato sauce to an upper surface of the pizza shell to form a pizza base, cooking the pizza base for a first predetermined time period at a first predetermined temperature and subsequently cooling the pizza base having a still moist sauce thereon to at or near room temperature. Once cooled, a predetermined quantity of pizza toppings are placed on the moist sauce including at least one of additional pizza sauce, cheese, meats, vegetables and spices is applied to the pizza base with the pizza now being fully prepared and either placed in a refrigerator for future use or further heated for a second predetermined time period at a second predetermined temperature and subsequently served to the consumer. By preparing the pizza in accordance with this method, the cheese and pizza sauce are prevented from blending with one another prior to consumption of the pizza by the consumer.

18 Claims, 2 Drawing Sheets

METHOD OF MAKING PIZZA

CROSS REFERENCE TO RELATED APPLICATIONS

This application is a continuation-in-part of application Ser. No. 08/804,956, filed Feb. 24, 1997 now abandoned, which is a continuation of application Ser. No. 08/512,338, filed Aug. 8, 1995, now abandoned.

TECHNICAL FIELD OF THE INVENTION

The present invention relates to a method of making a pizza and more particularly to a method of pre-cooking a pizza shell so as to expedite the later making of the pizza itself.

BACKGROUND OF THE INVENTION

The preparation and cooking of pizzas in the food industry requires numerous labor intensive steps as well as a necessary period of time. For example, pizza dough is prepared and formed into a shell which is then covered with a pizza sauce having toppings applied thereto with the prepared pizza subsequently being baked in an oven for a predetermined period of time. Additionally, at pizza restaurant delivery and/or carry-out businesses, each ingredient which is added as a topping is typically measured or weighted to ensure uniformity of the finished product. Clearly, preparing a pizza from an uncooked ball of dough is very time consuming.

In preparing foods of this type, if the food is to be consumed immediately after preparation, the baked or otherwise cooked doughy mass retains its dry and crisp resilient state even while being served in contact with the sauce which is placed thereon. Over time, however, the toppings which are placed on the tomato or pizza sauce blend together forming an undesirable appearance and taste. Specifically, the cheese which includes oils, when placed on the sauce bleeds into the sauce in a manner which is undesirable to the consumer.

With the advent of convenience foods generally, pizzas have increased in popularity and there is significant economic competition in the manufacturing and distribution of pizzas. Consequently, methods which provide the manufacture of such products with the ability to provide high and consistent quality at controlled cost are of great economic importance.

In the manufacture of products such as pizza at pizza restaurants or delivery establishments, it is customary to prepare the dough in any known manner such as hand tossed, thin and crispy or deep dish and subsequently cover the formed shell with tomato or pizza sauce and any number and combination of desired toppings. Once formed, the pizza is placed in an oven for a predetermined period of time and baked until the shell is crisp and the toppings such as cheese are melted forming a layer over the tomato sauce. Once baked for the predetermined period of time, the pizza is then removed from the oven and either consumed on the premises or delivered in as short a period of time as possible to the consumer. As mentioned hereinabove, those pizzas which are consumed substantially immediately after being baked, the doughy mass forming the shell retains its dry and crisp state even while being served.

U.S. Pat. No. 2,668,117 issued to Bucci discloses a method of making a frozen pizza wherein the pizza shell is formed in a known manner and sealed with an eatable sealing agent which is spread on the top of the shell prior to its being baked in an oven at 450° F. for approximately nine minutes. It is during this process that the yeast rises and the sealing agent penetrates the top portion of the dough which then itself coagulates so as to form a moisture impervious layer of minuscule thickness in the top portion of the shell. Once removed from the oven, tomato or pizza sauce is applied to the top surface of the shell with additional food elements such as cheese, meats or vegetables also be added. Subsequently, the pizza is quick frozen in a suitable chamber at −10° F. When consumed, the completed product is heated to its proper temperature for eating. However, it has been found that consumers prefer pizza which is not frozen and which can be delivered quickly or prepared quickly at their homes.

In another effort to provide a pizza which is acceptable to the consumer, U.S. Pat. No. 4,271,200 issued to Hempenius et al. discloses a pizza which is made from a frozen crust which is formed by providing a detent in the center portion of the crust for receiving the sauce and toppings therein. However, again, as discussed hereinabove, frozen pizzas while meeting the consumers need for efficiency still is not readily accepted by the consumer in that the taste of such product has not been found to be acceptable.

In yet another effort to manufacture a pizza of consistent quality and in an expedited manner, U.S. Pat. No. 5,256,432 issued to McDonald et al. sets forth a method wherein a pizza topping disk is used to uniformly form the pizza itself. Therein, a pizza topping disk is made by combining a quantity of cheese with a plurality of pizza toppings. The quantity of cheese and selected pizza toppings are combined into a layer that is appropriately shaped to be placed on a pizza shell. The cheese and pizza toppings are fused together to form a pizza topping disk that may be stored for subsequent use in assembling a pizza. In making a pizza in accordance with such method, the pizza topping disk is placed on an uncooked pizza shell and the pizza topping disk and an uncooked pizza shell are then baked to produce a cooked pizza. While the use of such a pizza topping disk allows for uniform consistency of the pizzas made, and reduces the time in preparing the pizza, such a method does not reduce the time in which the pizza can be served to the consumer from its time of ordering or from its time of placing in the oven.

Therefore, there is clearly a need for a method of making a pizza which provides not only a pizza which is aesthetically and tastefully pleasing to the consumer, but may also be prepared in an expedited manner and served to the consumer while hot even if such pizza is being delivered to the consumer's home.

SUMMARY OF THE INVENTION

It is a primary object of the present invention to provide a method of preparing a pizza which overcomes the aforementioned shortcomings associated with the prior art methods.

A further object of the present invention is to define a method of manufacturing a pizza wherein the pizza base is previously prepared and stored for future use.

A further object of the present invention is to provide a method of preparing a pizza wherein the cheese and pizza sauce are prevented from blending with one another prior to consumption of the pizza by the consumer.

Yet another object of the present invention is to provide a method of manufacturing a pizza wherein the pizza can be served in an expedited manner.

A still further object of the present invention is to provide a method of preparing a pizza wherein the time between ordering of the pizza and its delivery is significantly reduced.

A still further object of the present invention is to provide a method of preparing a pizza wherein a pre-cooked pizza can be removed from a refrigerator in its fully prepared state and heated and served in an expedited manner.

These, as well as additional objects of the present invention, are achieved by a method of preparing a pizza comprising the steps of forming a pizza shell, applying a predetermined quantity of pizza or tomato sauce to an upper surface of the pizza shell to form a pizza base, cooking the pizza base for a first predetermined time period at a first predetermined temperature and subsequently cooling the pizza base to at or near room temperature. During and after this cooking process, the sauce applied to the pizza shell remains in a moist state. This state being similar to that of a conventionally made pizza and not a coagulated, dried or hardened state. Once cooled, a predetermined quantity of pizza toppings including at least one of additional pizza sauce, cheese, meats, vegetables and spices are applied to the pizza base with the pizza now being fully prepared and either placed in a refrigerator for future use or further heated for a second predetermined time period at a second predetermined temperature and subsequently served to the consumer.

In accordance with a preferred embodiment of the present invention, the first predetermined time period is in the range of 5–15 minutes with the first predetermined temperature being in the range of 300° F. to 500° F. Further, the second predetermined time period is in the range of 1–10 minutes with the second predetermined temperature being in the range of 200° F. to 500° F. More preferably, the second predetermined time period is in the range of 4–6 minutes. Again, it should be noted that after cooking for the first predetermined time period, the sauce applied to the pizza shell remains in a moist state, this state being similar to that of conventionally made pizza and not a coagulated, dried or hardened state.

Pizzas prepared in the manner set forth hereinabove can be manufactured at small manufacturing plants throughout the country. These small plants would involve making pizza dough, cooking the crust with the tomato sauce thereon, cooling the crust having the moist sauce thereon, adding the cheese and toppings and putting the pizza in a box and storing it in a refrigerated cooler. Pizzas prepared in this manner from such plants can be readily shipped to nearby locations for use in school lunch programs, pizza home delivery locations and small scale vending carts.

In this manner, schools in the area can be delivered pizzas and a toaster type oven or a small conveyor type oven can be used to prepare the pizzas on an as needed basis. The previously prepared pizzas would be removed from the box and heated and subsequently served in the same box. Further, pizzas which are not sold on that particular day may be readily stored in a refrigerator and sold at a later time.

As noted hereinabove, pizzas prepared in this manner may be readily served to the consumer on a delivery basis which would include a mobile pizza delivery station having a refrigerator unit for storing the prepared pizza and an oven unit for heating the pizza. In the preferred embodiment, when a call is received by the driver, the pizza will be removed from the refrigerator and placed in the oven and cooked while the driver heads to the consumer's home. When the approximately 5 minute cook time has elapsed, the oven would automatically shut off; however, the pizza would remain hot in the oven. When the truck arrives at the consumer's home, the pizza would be removed from the oven, cut in a known manner and placed in its original container. Accordingly, the consumer would receive a fresh pizza right out of the oven at their home. Such a mobile unit could have as many as four or five ovens which would operate off of a generator or batteries.

Also as noted hereinabove, pizzas prepared in accordance with the present invention would be readily suitable for small vending cart locations which may be located in airports, at special events or similar locations. When ordered, the pizza would be removed from the refrigerator and placed in the oven and heated for a predetermined time period, preferably 4–6 minutes. Once heated, the pizza would be served directly to the consumer.

These, as well as additional advantages of the present invention will become apparent from the following detailed description when read in light of the several figures.

DETAILED DESCRIPTION OF THE INVENTION

Figure 1:
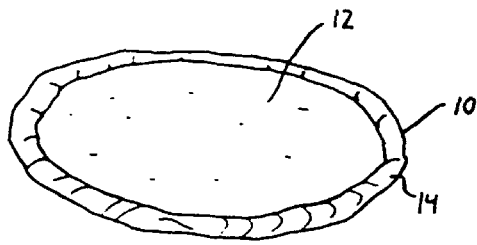
FIG. 1 is a perspective view of a pizza shell prepared in accordance with the present invention.

Referring now to the several figures wherein like reference numerals will be used to designate like elements throughout the several figures, an uncooked pizza shell 10 is illustrated in FIG. 1. The uncooked pizza shell 10 may take on any configuration and may include but is not limited to pizza shells for a hand tossed traditional crust, a pan style pizza or a thin crust style pizza, these styles of pizza being well-known in the art. For purposes of illustration, the uncooked shell 10 is of the hand tossed traditional crust style.

Figure 2:
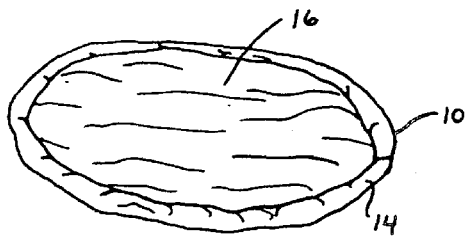
FIG. 2 is a perspective view of the shell illustrated in FIG. 1 having the tomato or pizza sauce placed thereon.

When prepared, the uncooked shell 10 includes a substantially planar central region 12 which is surrounded about a periphery thereof by a raised crust portion 14. As can be seen from FIG. 2, once formed, the substantially planar region 12 of the uncooked shell 10 is substantially completely covered with a layer of tomato or pizza sauce 16. Once covered with the pizza sauce 16, the uncooked shell is placed in an oven and baked at a temperature in the range of 300° F. to 500° F. for a time period in the range of 5–15 minutes. It should be noted while it is preferable to fully cook the shell 10 in this stage of the process, the shell 10 may be only partially cooked at this stage of the preparation and fully cooked at a later time in the process. During and after this cooking process, the sauce applied to the pizza shell remains in a moist state. This state being similar to that of a conventionally made pizza and not a coagulated, dried or hardened state.

Figure 3:
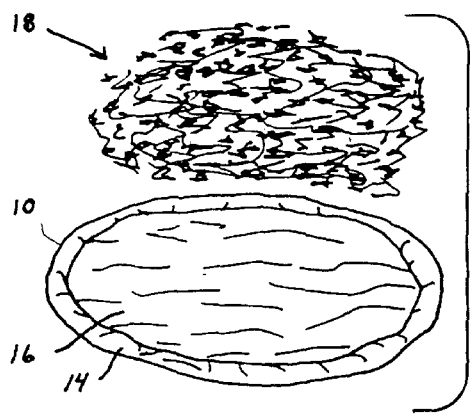
FIG. 3 is a perspective view of a pizza shell which has been cooked in accordance with the present invention illustrating the toppings being placed thereon.
Figure 4:
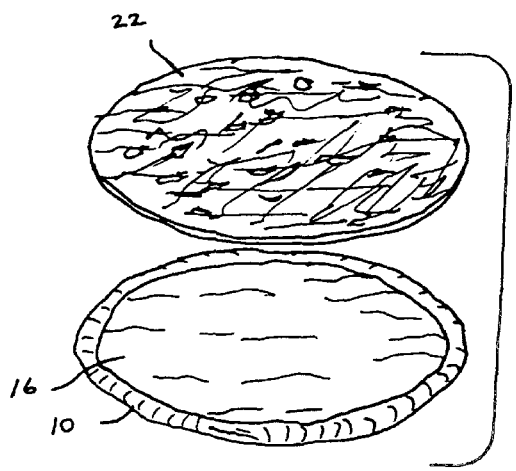
FIG. 4 is a perspective view of the pizza shell prepared in accordance with the present invention having the toppings placed thereon in accordance with an alternative embodiment of the present invention.
Figure 5:
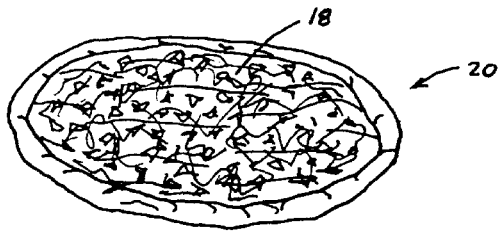
FIG. 5 is a perspective view of a completed pizza- formed in accordance with the present invention.

Referring now to FIG. 3, the now cooked shell 10 having the pizza sauce 16 thereon is allowed to cool to at or near room temperature, with the pizza sauce 16 continuing to be in a moist state. Once cooled, the selected pizza toppings 18 can then be placed on an upper surface of the sauce 16. The pizza toppings 18 may include, but are not limited to, additional pizza sauce, various types of cheeses, sliced meats, cooked meats, ground meats, vegetables and spices. The toppings are placed on the surface of the pizza sauce 16 in order to form a pizza 20 as illustrated in FIG. 5. In this condition, the shell 10 is at least substantially cooked; however, the pizza toppings 18 placed thereon are not heated. The significant advantage of this particular process is that by cooking the pizza with only the sauce thereon eliminates the possibility of the cheese and moist tomato sauce from blending together when the cheese melts. The cheese and sauce can only blend together when in a heated condition. Cooking the pizza with only the pizza sauce thereon and subsequently adding the cheese and other toppings over the cooled moist pizza sauce allows the pizza to be served at any time, with the pizza having a taste and appearance substantially identical to that of a fresh baked pizza.

Once in the condition illustrated in FIG. 5, the pizza can either be reheated at that time and served or placed in a refrigerator for serving in the future. When reheating the pizza, whether it be immediately after placing the toppings thereon or sometime later, the pizza is heated at a temperature in the range of 200° F. to 500° F. for a time period in the range of 1–10 minutes. Preferably, the pizza is cooked for a time period in the range of 4–6 minutes. Again, with pizzas which are stored in a refrigerator, by initially cooking the pizza with only the sauce thereon prevents the cheese and moist sauce from blending together. Consequently, when the pizza is later reheated, the cheese will only then melt such that when the pizza is served, the melted cheese and sauce will not have had time to blend together.

In an alternative embodiment of the present invention, a pizza toppings disk similar to that illustrated in U.S. Pat. No. 5,256,432 discussed hereinabove can be pre-made and placed on the cooked and cooled shell 10 having the moist sauce 16 thereon. In doing so, the amount of time it takes in preparing the pizza can be reduced and the consistency of pizzas being prepared by a number of different individuals can be controlled.

Pizzas prepared in the manner set forth hereinabove can be manufactured at small manufacturing plants throughout the country. These small plants would involve making pizza dough, preparing the dough into a pizza shell and cooking the pizza shell with the moist sauce thereon, cooling the shell having the moist sauce thereon, adding the toppings and subsequently putting the pizza in a box and storing it in a refrigerated cooler for subsequent use. These pizzas can then be readily shipped to nearby locations for use in school lunch programs, pizza home delivery locations and small scale vending carts.

In this manner, schools in the area can be delivered pizzas and a toaster type oven or a small conveyor type oven to prepare the pizzas on an as needed basis. The previously prepared pizzas would be removed from the box and heated and subsequently served in the same box. Further, pizzas which are not sold on that particular day may be readily stored in a refrigerator and sold at a later time.

Again, as noted hereinabove, pizzas prepared in this manner may be readily served to the consumer on a delivery basis which would include a mobile pizza delivery station having a refrigerated unit for storing the prepared pizza and an oven unit for heating the pizza. In the preferred embodiment, when a call is received by the driver, the pizza will be removed from the refrigerator and placed in the oven and cooked while the driver heads to the consumer's home. When the approximately five minute cook time has elapsed, the oven would automatically shut off; however, the pizza would remain hot in the oven. When the driver arrives at the consumer's home, the pizza would be removed from the oven, cut in a known manner and placed in its original container. In doing so, the consumer would receive a fresh pizza right out of the oven at their home. Such a mobile unit could have as many as four or five ovens.

Additionally, pizzas prepared in accordance with the present invention would be readily suitable for small vending cart locations which may be located in airports, at special events or similar locations. When ordered, the pizza would be removed from the refrigerator and placed in the oven and heated for a predetermined time period, preferably 4–6 minutes as noted hereinabove. Once heated, the pizza would be served directly to the consumer. Further, in addition to small scale pizza operations or delivery operations, pizzas prepared in the manner set forth in accordance with the present invention may be served in restaurants as well wherein the time between the taking of the customer's order and the serving of the pizza can be significantly reduced in that the pizza shell having the sauce thereon is already at least partially cooked and preferably fully cooked. Therefore, rather than have a cook time of 10–15 minutes, the pizza can be fully cooked and ready for consumption in approximately 5 minutes.

Figure 6:
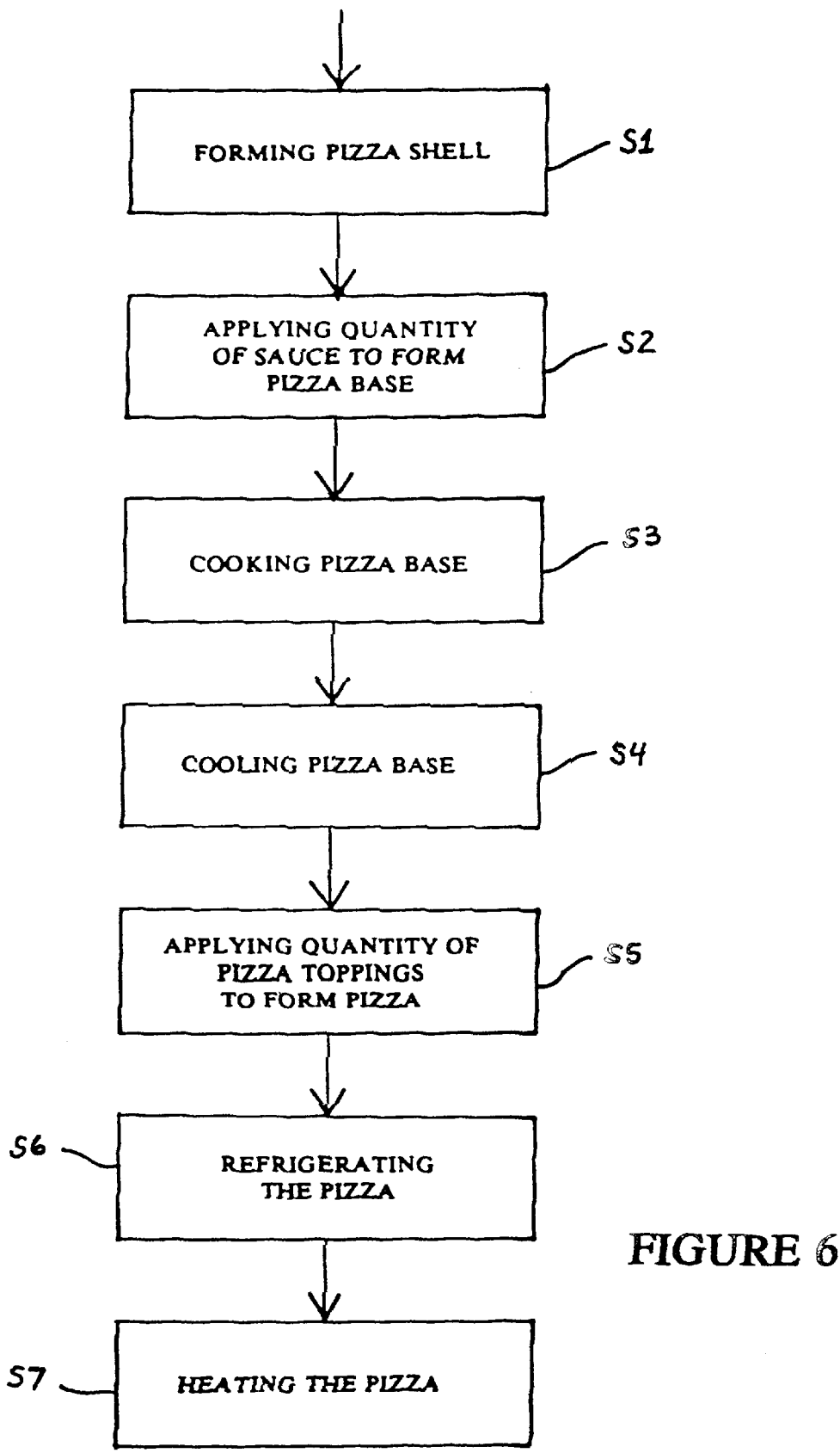
FIG. 6 is a flow diagram indicating the sequential steps carried out in preparing a pizza in accordance with the present invention.

Referring now to FIG. 6, the sequential steps carried out in preparing a pizza in accordance with the present invention will be reviewed.

Initially, in step S1, a pizza shell in formed in any known manner. That is, the pizza shell may be of the traditional hand tossed type, the pan style pizza or thin crust type pizza. After the pizza shell is formed, in the step S2, a sufficient quantity of sauce is placed on a central portion of the pizza shell in order to form a pizza base. Once the pizza base is formed, the pizza base is substantially cooked in step S3. In step S3, the pizza is cooked for 5–15 minutes at a temperature in the range of 300° F. to 500° F. Once cooked the pizza base having a still moist sauce thereon is allowed to fully cool to approximately room temperature during the step S4. At this point, the cooled pizza base having a still moist sauce thereon may be refrigerated with the toppings being subsequently placed on the pizza; however, more preferably, in the step S5, a predetermined quantity of pizza toppings are placed on the moist sauce of the pizza base in order to form a pizza. At this point, the pizza may be refrigerated in the step S6 for future use. When desired, in step S7, the pizza is removed from the refrigerator and heated at a temperature in the range of 200° F. to 500° F. for a time period of 1–10 minutes and preferably 4–6 minutes. Once heated, the pizza can be removed and served to the consumer. It should be noted that the refrigerating step set forth in step 6 may be eliminated with the pizza formed in step S5 being reheated without being further refrigerated.

Accordingly, as can be seen from the foregoing, and in accordance with the present invention, a method for making a pizza which is prepared in an expedited manner and served to the consumer while hot even if the pizza is being delivered to the consumer's home which is both aesthetically and tastefully pleasing to the consumer.

While the present invention has been described with reference to preferred embodiments, it should be appreciated by those skilled in the art that the invention may be practiced otherwise that is specifically described herein without departing from the spirit and scope of the invention. It is, therefore, to be understood that the spirit and scope of the invention be limited by the appended claims.

We claim:

1. A method of preparing a pizza comprising the steps of:

forming a pizza shell;

applying a predetermined quantity of sauce to an upper surface of said pizza shell to form a pizza base;

cooking said pizza base at a first predetermined temperature for a first predetermined time period;

maintaining said sauce in an uncoagulated state during cooking of said pizza base;

cooling said pizza base for a predetermined time period;

applying a predetermined quantity of pizza toppings; and further heating said pizza base having said predetermined quantity of sauce and said predetermined quantity of pizza toppings thereon at a second predetermined temperature for a second predetermined time period.

2. The method as defined in claim 1, wherein said step of applying a predetermined quantity of sauce to an upper surface of said pizza shell includes applying said sauce to a central region of said pizza shell.

3. The method as defined in claim 1, wherein said first predetermined time period is in a range of 5–15 minutes.

4. The method as defined in claim 1, wherein said first predetermined temperature is in a range of 300° F. to 500° F.

5. The method as defined in claim 1, wherein said second predetermined time period is in a range of 1–10 minutes.

6. The method as defined in claim 1, wherein said second predetermined time period is in a range of 4–6 minutes.

7. The method as defined in claim 1, wherein said second predetermined temperature is in the range of 200° F. to 500° F.

8. The method as defined in claim 1, wherein said pizza toppings are selected from a group consisting of additional pizza sauce, cheese, sliced meats, cooked meats, ground meats, vegetables and spices.

9. The method as defined in claim 8, wherein said pizza toppings are of a predetermined combination and are fused together to form a pizza disk to be applied to said pizza base.

10. A method of preparing a pizza comprising the steps of:

forming a pizza shell;

applying a predetermined quantity of sauce to an upper surface of said pizza shell to form a pizza base;

cooking said pizza base at a first predetermined temperature for a first predetermined time period;

maintaining said sauce in an uncoagulated state during cooking of said pizza base;

cooling said pizza base for a predetermined time period;

applying a predetermined quantity of pizza toppings including at least one of cheese, meat and vegetables to form a completed pizza;

refrigerating said completed pizza; and heating said completed pizza having said predetermined quantity of sauce and said predetermined quantity of pizza toppings thereon at a second predetermined temperature for a second predetermined time period.

11. The method as defined in claim 10, wherein said step of applying a predetermined quantity of sauce to an upper surface of said pizza shell includes applying said sauce to a central region of said pizza shell.

12. The method as defined in claim 10, wherein said first predetermined time period is in a range of 5–15 minutes.

13. The method as defined in claim 10, wherein said first predetermined temperature is in a range of 300° F. to 500° F.

14. The method as defined in claim 10, wherein said second predetermined time period is in a range of 1–10 minutes.

15. The method as defined in claim 10, wherein said second predetermined time period is in a range of 4–6 minutes.

16. The method as defined in claim 10, wherein said second predetermined temperature is in the range of 200° F. to 500° F.

17. The method as defined in claim 10, wherein said pizza toppings are selected from a group consisting of additional pizza sauce, cheese, sliced meats, cooked meats, ground meats, vegetables and spices.

18. The method as defined in claim 17, wherein said pizza toppings are of a predetermined combination and are fused together to form a pizza disk to be applied to said pizza base.

* * * * *